US010555339B2

(12) United States Patent
Bhorkar et al.

(10) Patent No.: US 10,555,339 B2
(45) Date of Patent: Feb. 4, 2020

(54) TRANSMISSION OF (E)PDCCH WITHIN PARTIAL SUBFRAME IN LICENSED ASSISTED ACCESS (LAA)

(71) Applicant: Intel IP Corporation, Santa Clara, CA (US)

(72) Inventors: Abhijeet Bhorkar, Fremont, CA (US); Hwan-Joon Kwon, Santa Clara, CA (US); Jeongho Jeon, San Jose, CA (US); Qiaoyang Ye, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/765,764

(22) PCT Filed: Mar. 28, 2016

(86) PCT No.: PCT/US2016/024440
§ 371 (c)(1),
(2) Date: Apr. 4, 2018

(87) PCT Pub. No.: WO2017/074489
PCT Pub. Date: May 4, 2017

(65) Prior Publication Data
US 2018/0295649 A1     Oct. 11, 2018

Related U.S. Application Data

(60) Provisional application No. 62/247,877, filed on Oct. 29, 2015.

(51) Int. Cl.
*H04W 74/08*     (2009.01)
*H04L 5/00*      (2006.01)
(Continued)

(52) U.S. Cl.
CPC ....... *H04W 74/0808* (2013.01); *H04L 5/0048* (2013.01); *H04W 16/14* (2013.01); *H04W 72/042* (2013.01); *H04W 72/0446* (2013.01)

(58) Field of Classification Search
None
See application file for complete search history.

(56) References Cited

U.S. PATENT DOCUMENTS 9,544,887 B2 *  1/2017  Kim .................. H04L 5/001
10,110,428 B2 * 10/2018  Um ................... H04L 41/0803
(Continued)

FOREIGN PATENT DOCUMENTS

WO   WO-2017030310 A1 *  2/2017  ........... H04L 1/1816

OTHER PUBLICATIONS

"Further details of partial subframe." Source: Intel Corporation. Agenda Item: 6.2.3.3. 3GPP TSG RAN WG1 Meeting #83, Anaheim, USA, Nov. 15-22, 2015, R1-156517, 5 pages.
(Continued)

*Primary Examiner* — Ayaz R Sheikh
*Assistant Examiner* — Tarell A Hampton
(74) *Attorney, Agent, or Firm* — Eschweiler & Potashnik, LLC

(57) ABSTRACT

Techniques for transmission of a physical downlink control channel (PDCCH) or enhanced PDCCH (EPDCCH) within a partial subframe of a license assisted access (LAA) burst are discussed. One example apparatus comprises a processor configured to generate a LAA burst; generate one or more downlink control channel messages that comprise at least one of PDCCH messages or EPDCCH messages; generate a physical layer encoding of the LAA burst comprising a first partial subframe, wherein the first partial subframe comprises a physical layer encoding of the one or more downlink control channel messages; and output the first partial subframe comprising the physical layer encoding of the one or more control channel messages to transmitter circuitry for subsequent transmission via an unlicensed carrier.

17 Claims, 12 Drawing Sheets

(51) Int. Cl.
   *H04W 16/14*   (2009.01)
   *H04W 72/04*   (2009.01)

(56)        References Cited

U.S. PATENT DOCUMENTS

| | | | | |
|---|---|---|---|---|
| 10,135,594 | B2* | 11/2018 | Jung | H04L 5/001 |
| 2015/0319784 | A1* | 11/2015 | Bhushan | H04W 74/08 |
| | | | | 370/329 |
| 2016/0302230 | A1* | 10/2016 | Novlan | H04B 17/318 |
| 2016/0302231 | A1* | 10/2016 | Chien | H04W 74/0816 |
| 2016/0338053 | A1* | 11/2016 | Park | H04W 74/0808 |
| 2016/0345206 | A1* | 11/2016 | Yerramalli | H04W 74/006 |
| 2017/0005768 | A1* | 1/2017 | Yin | H04L 5/0055 |
| 2017/0019909 | A1* | 1/2017 | Si | H04L 47/27 |
| 2017/0048884 | A1* | 2/2017 | Jung | H04L 5/001 |
| 2017/0079013 | A1* | 3/2017 | Noh | H04W 72/042 |
| 2017/0142743 | A1* | 5/2017 | Yoon | H04L 5/0048 |
| 2017/0289818 | A1* | 10/2017 | Ng | H04W 48/12 |
| 2017/0311322 | A1* | 10/2017 | Kim | H04W 72/04 |
| 2017/0347270 | A1* | 11/2017 | Iouchi | H04W 16/14 |
| 2018/0019836 | A1* | 1/2018 | Kim | H04J 11/0079 |
| 2018/0092128 | A1* | 3/2018 | Um | H04W 74/0808 |
| 2018/0103458 | A1* | 4/2018 | Tooher | H04W 16/14 |
| 2018/0124611 | A1* | 5/2018 | Moon | H04L 5/0055 |
| 2018/0132209 | A1* | 5/2018 | Shimezawa | H04J 11/00 |
| 2018/0175975 | A1* | 6/2018 | Um | H04L 1/1816 |
| 2018/0206138 | A1* | 7/2018 | Hayashi | H04W 16/14 |
| 2018/0227838 | A1* | 8/2018 | Hayashi | H04L 5/001 |
| 2018/0234988 | A1* | 8/2018 | Shimezawa | H04W 16/14 |
| 2018/0241499 | A1* | 8/2018 | Einhaus | H04L 1/00 |
| 2018/0242283 | A1* | 8/2018 | Feng | H04L 5/001 |
| 2018/0270757 | A1* | 9/2018 | Ahn | H04L 5/00 |
| 2018/0278373 | A1* | 9/2018 | Wang | H04L 1/1812 |
| 2018/0295609 | A1* | 10/2018 | Shimezawa | H04W 16/14 |

OTHER PUBLICATIONS

"3rd Generation Partnership Project; Technical Specification Group Radio Access Network; Study on Licensed-Assisted Access to Unlicensed Spectrum; (Release 13)," 3GPP TT 36.889 V13.0.0 (Jun. 2015) Lte Advance. 87 pages.

"3rd Generation Partnership Project; Technical Specification Group Radio Access Network; Study on Licensed-Assisted Access to Unlicensed Spectrum; (Release 13)," 3GPP TR 36.889 V13.0.0 (Jun. 2015) Lte Advance. Annex B1. 125 pages.

"3rd Generation Partnership Project; Technical Specification Group Radio Access Network; Study on Licensed-Assisted Access to Unlicensed Spectrum; (Release 13)." 3GPP TR 36.889 V13.0.0 (Jun. 2015) Lte Advance. Annex B2. 54 pages.

"3rd Generation Partnership Project; Technical Specification Group Radio Access Network; Study on Licensed-Assisted Access to Unlicensed Spectrum; (Release 13)." 3GPP TR 36.889 V13.0.0 (Jun. 2015) Lte Advance. Annex B3. 20 pages.

"Extended Subframes and (e)PDCCH for LAA downlink." Agenda Item: 7.2.3.3. Source: Intel Corporation. 3GPP TSG RAN WG1 Meeting #80, Athens, Greece, Feb. 9-13, 2015, R1-150090, 7 pages.

"On the starting and ending positions for LAA DL sub-frame." Source: Intel Corporation. Agenda Item: 7.2.4.3, b3GPP TSG RAN WG1 Meeting #82, Beijing, China, Aug. 24-28, 2015. R1-154082. 3 pages.

"Details of Design on DL frame structure for LAA." Source: ZTE; Agenda Item: 7.2.3.3, 3GPP TSG RAN WG1 Meeting #82bis. Malmoe, Sweden, Oct. 5-9, 2015. R1-155256. 7 pages.

"On the starting and ending positions for LAA DL sub-frame." Source: Intel Corporation. Agenda Item: 7.2.3.3. 3GPP TSG RAN WG1 Meeting #82bis, Malmoe, Sweden, Oct. 5-9, 2015. R1-155315, 2 pages.

International Search Report dated Jul. 19, 2016 for International Application PCT/US2016/024440.

* cited by examiner

TRANSMISSION OF (E)PDCCH WITHIN PARTIAL SUBFRAME IN LICENSED ASSISTED ACCESS (LAA)

REFERENCE TO RELATED APPLICATIONS

This application is a National Phase entry application of International Patent Application No. PCT/US2016/024440 filed Mar. 28, 2016, which claims priority to U.S. Provisional Application 62/247,877 filed on Oct. 29, 2015, entitled "DESIGN AND TRANSMISSION OF (E)PDCCH WITHIN PARTIAL SUBFRAME IN LICENSED ASSISTED ACCESS" in the name of Abhijeet Bhorkar et al. and is hereby incorporated by reference in its entirety.

FIELD

The present disclosure relates to wireless technology, and more specifically to techniques for communicating control channel information via a partial subframe of a license assisted access (LAA) burst transmission.

BACKGROUND

Licensed Assisted Access (LAA) is a technology considered for inclusion in LTE (Long Term Evolution) Release 13 to meet the ever increasing demand for high data rate in wireless cellular networks by utilizing the carrier aggregation (CA) feature supported in LTE-A (LTE Advanced) systems to combine the data transmission over a licensed primary carrier and one or more unlicensed component carriers. The 5 GHz band is of current interest in 3GPP (the Third Generation Partnership Project). For fair coexistence with the incumbent systems at the 5 GHz band such as IEEE 802.11 (Institute of Electrical and Electronics Engineers standard 802.11) based wireless local area networks (WLAN), Listen-Before-Talk (LBT) is a feature recommended for inclusion in Release 13 LAA system.

According to 3GPP TS (Technical Specification) 36.213, for unlicensed band transmission, the category 4 LBT mechanism is used for LAA DL transmission bursts containing PDSCH (physical downlink shared channel). With category 4 LBT, the LAA eNB (Evolved NodeB) can sense the channel and perform DL (downlink) transmission at any time instant. However, conventionally, the starting of the transmission for DL burst is aligned with the Pcell (Primary cell) subframe boundary, as the existing Release-12 CA mechanism in LTE assumes Pcell-aligned transmission on the Scell (Secondary cell). If such a Pcell-aligned restriction is enforced, the interval from the ending of the LBT until the Pcell subframe boundary can be wasted, as it would not be utilized for data transmission. In this regard, a partial TTI (transmission time interval) is defined on a subset of OFDM (orthogonal frequency division multiplexing) symbols within a DL subframe, while still maintaining the Pcell-aligned timing relationship for the DL burst transmission.

With a partial subframe, even though it is possible for the eNB to transmit immediately after completing the LBT, the eNB may start PDSCH transmission at certain known OFDM symbol positions within a subframe with respect to the Pcell subframe boundary to limit the UE (user equipment) blind detection complexity in determining the starting positions of the DL transmission burst. Limiting the starting positions within the subframe may also help reduce eNB scheduling complexity, as eNB may a priori prepare partial subframes for all possible starting positions.

DETAILED DESCRIPTION

Figure 1:
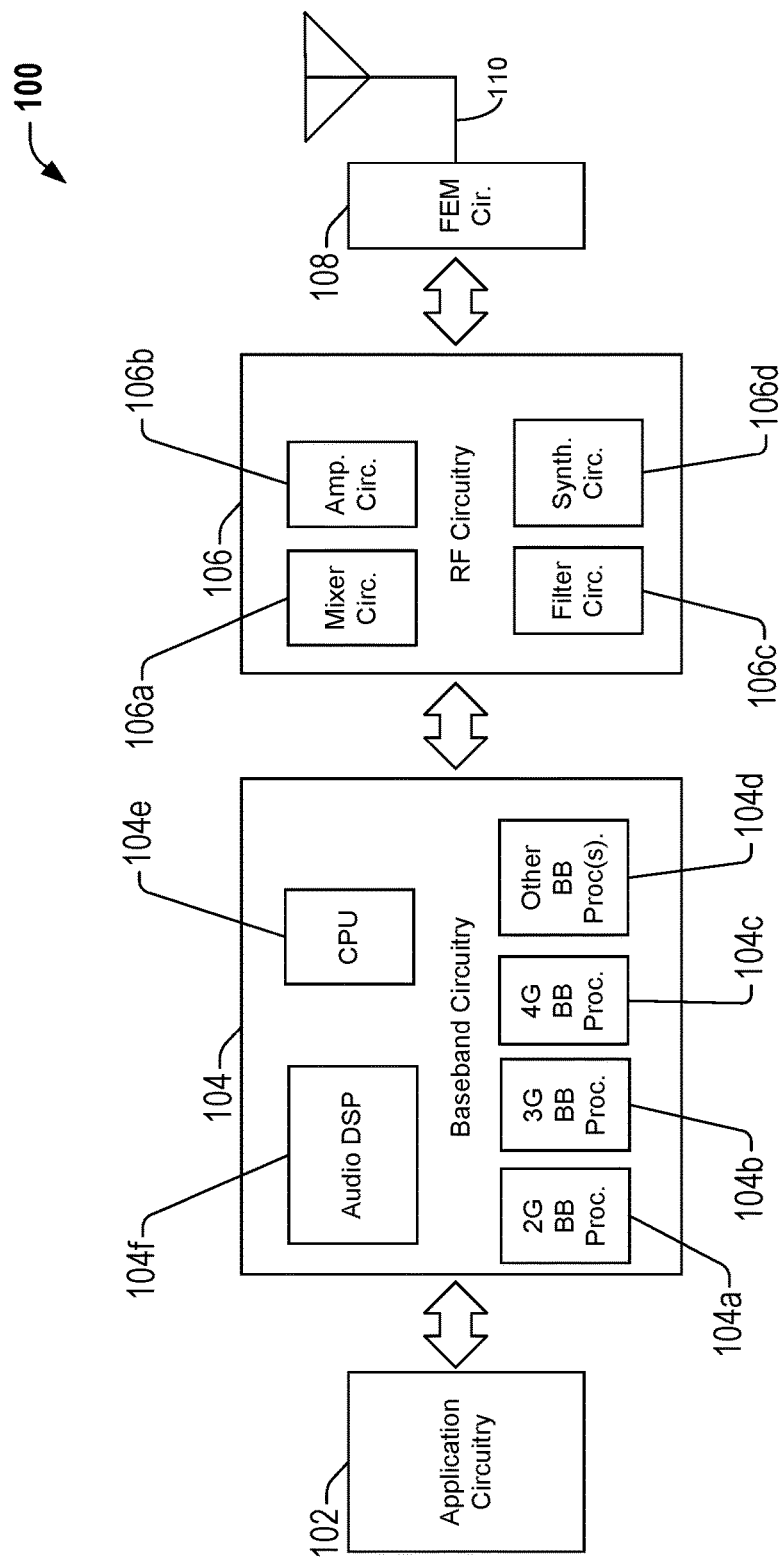
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Additionally, although the above example discussion of device 100 is in the context of a UE device, in various aspects, a similar device can be employed in connection with an Evolved NodeB (eNB).

Figure 2:
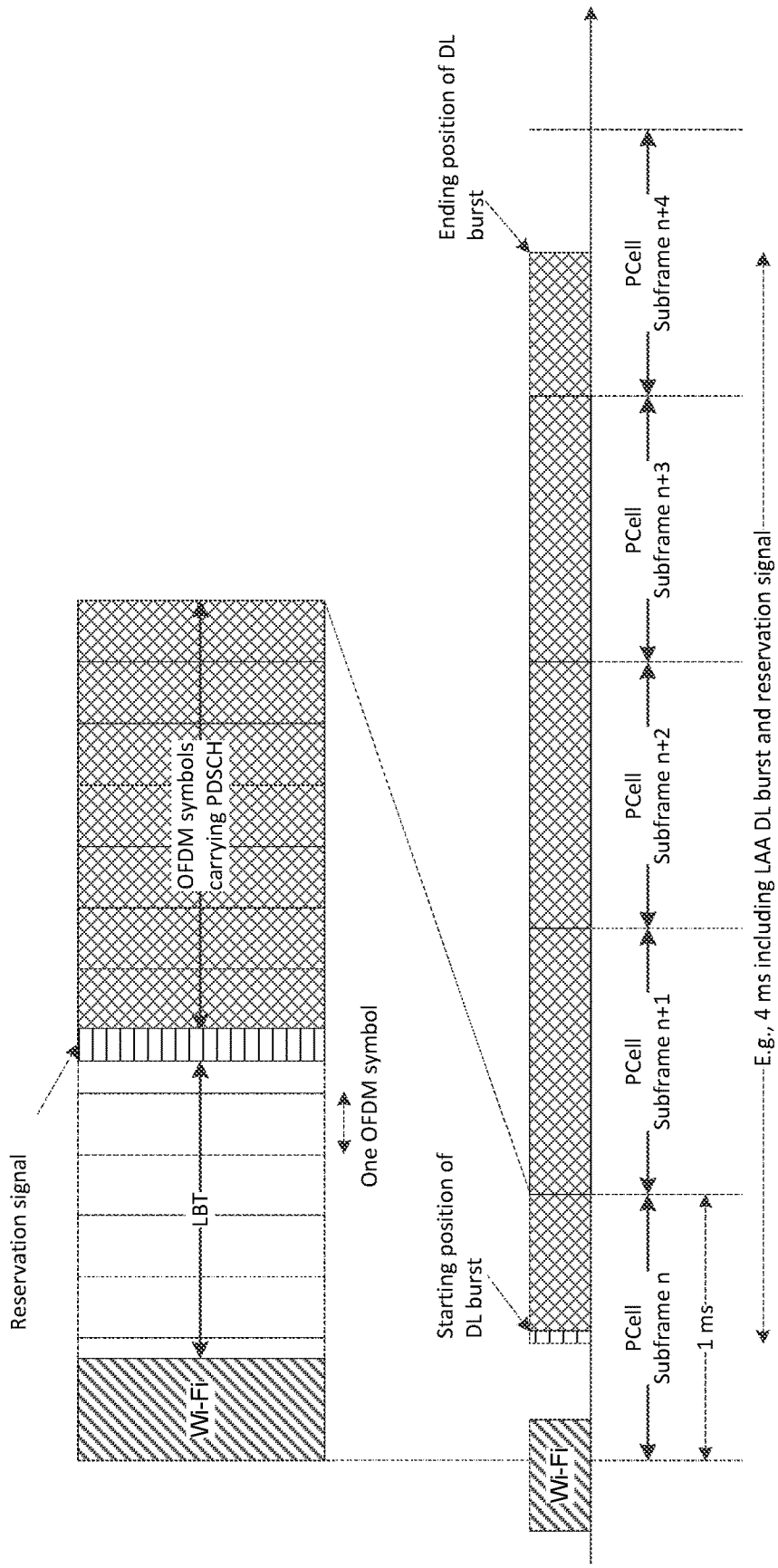
FIG. 2 is a timing diagram illustrating a LAA (Licensed Assisted Access) DL (downlink) burst transmission that can comprise (E)PDCCH (PDCCH (physical downlink control channel) and/or EPDCCH (enhanced PDCCH)) transmitted via a partial subframe of the LAA DL burst transmission according to various aspects described herein.

Referring to FIG. 2, illustrated is a timing diagram of a LAA (Licensed Assisted Access) DL (downlink) burst transmission that can comprise (E)PDCCH (PDCCH (physical downlink control channel) and/or EPDCCH (enhanced PDCCH)) transmitted within a partial subframe of the LAA DL burst transmission according to various aspects described herein. FIG. 2 shows an LAA DL burst transmission with partial subframes at the beginning (in the subframe labeled PCell Subframe n) and end (in the subframe labeled PCell Subframe n+4). As LBT (listen before talk) can be completed at any time before the allowed starting positions, the LAA eNB can reserve the channel immediately after the completion of LBT until the allowed starting position of DL transmission, as shown via the included reservation signal before the starting position of the DL burst. If the starting position is not aligned with the Pcell boundary, then the transmission of the DL transport block starts with a partial subframe and ends with a partial subframe. The duration of the starting/ending partial subframe is dependent on the choice of starting/ending positions for the LAA burst.

In conventional LTE (Long Term Evolution) systems such as Release 12 of LTE, PDCCH has been defined for Type 1 (FDD (frequency division duplexing)) and Type 2 (TDD (time division duplexing)) frame structures. The start of PDCCH is conventionally at symbol 0, while the ending symbol for PDCCH is in the range between OFDM (or-thogonal frequency division multiplexing) symbol #0 and #2 of the first slot of the subframe for channel bandwidths of 3 MHz up to 20 MHz, and is in the range between OFDM symbol #1 and #3 of the first slot of the subframe for a channel bandwidth of 1.4 MHz. The size of PDCCH is indicated by PCFICH (physical control format indicator channel). In various aspects described herein, techniques for transmitting PDCCH via partial subframes (e.g., slot-aligned partial subframes having 7 symbols (for normal CP) or 6 symbols (for extended CP), or partial subframes that are not slot-aligned) are discussed, which is not addressed by conventional LTE systems (e.g., in the current standard).

Also in conventional LTE systems such as Release 12 of LTE, EPDCCH has been defined for Type 1 (FDD) and Type 2 (TDD) frame structures. Conventionally, the start of EPDCCH is in the range between OFDM symbol #1 and #3 of the first slot of the subframe. In addition, for the TDD frame structure, EPDCCH has been defined for the Downlink Pilot Time Slot (DwPTS) within the special subframes for configurations 0, 1, 2, 3, 4, 5, 6, 7, 8, and 9, comprising OFDM symbols 3, 9, 10, 11, 12, 3, 9, 10, 11, and 6, respectively, for normal CP (cyclic prefix). In various aspects described herein, techniques for transmitting EPDCCH via partial subframes (e.g., slot-aligned partial subframes, or partial subframes that are not slot-aligned) are discussed, which is not addressed by conventional LTE systems (e.g., in the current standard).

Figure 3:
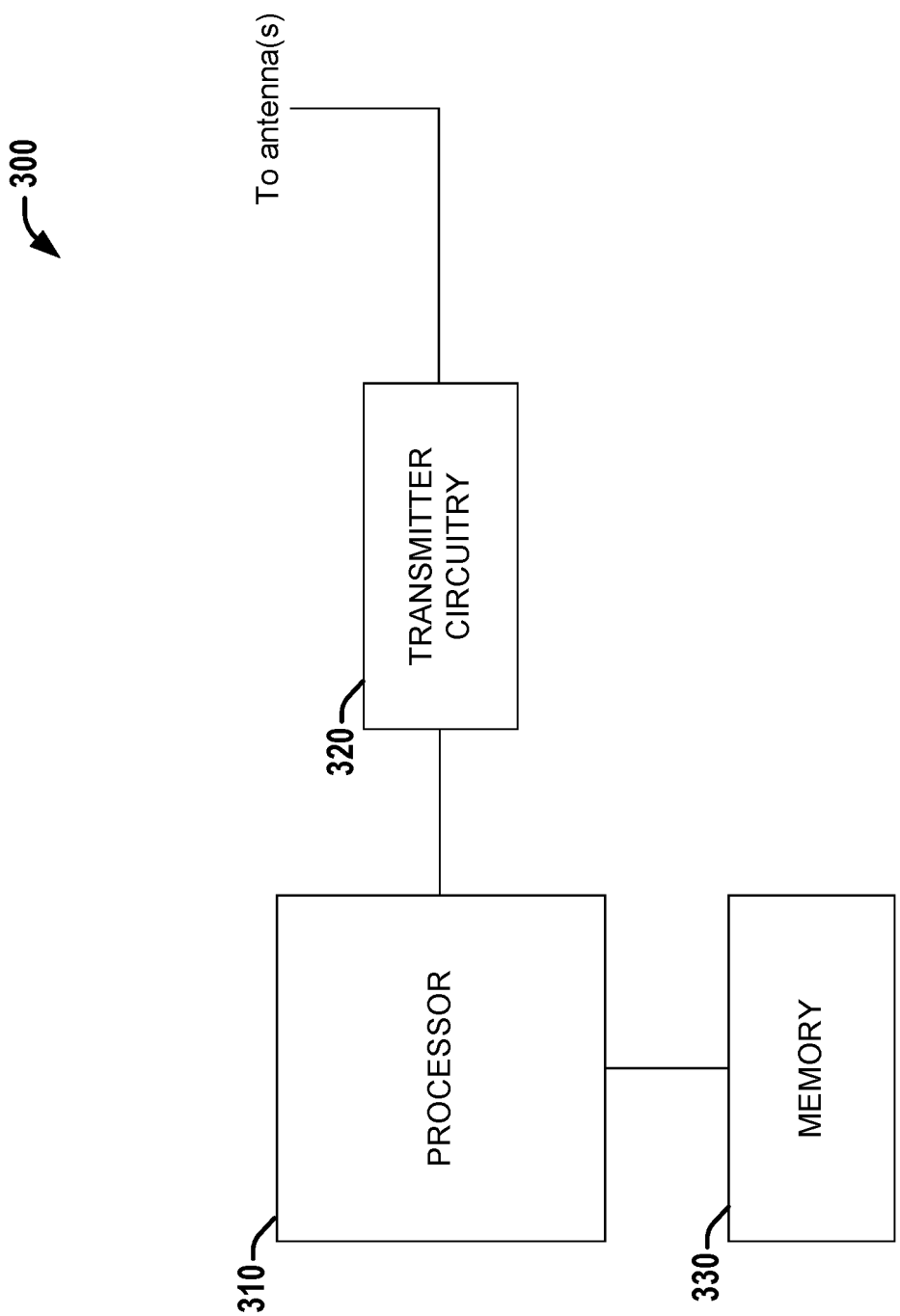
FIG. 3 is a block diagram illustrating a system that facilitates communication of (E)PDCCH (e.g., PDCCH and/or EPDCCH) via a partial subframe of a LAA (licensed assisted access) burst from a base station according to various aspects described herein.

Referring to FIG. 3, illustrated is a block diagram of a system 300 that facilitates communication of (E)PDCCH (e.g., PDCCH and/or EPDCCH) via a partial subframe of a LAA (licensed assisted access) burst from a base station according to various aspects described herein. System 300 can include a processor 310 (e.g., a baseband processor such as one of the baseband processors discussed in connection with FIG. 1), transmitter circuitry 320, and memory 330 (which can comprise any of a variety of storage mediums and can store instructions and/or data associated with one or more of processor 310, or transmitter circuitry 320). In various aspects, system 300 can be included within an Evolved Universal Terrestrial Radio Access Network (EUTRAN) Node B (Evolved Node B, eNodeB, or eNB) or other base station in a wireless communications network. In some aspects, processor 310, transmitter circuitry 320 and the memory 330 can be included in a single device, while in other aspects, they can be included in different devices, as part of a distributed architecture. As described in greater detail below, system 300 can facilitate transmission of an LAA burst comprising at least one partial subframe with PDCCH and/or EPDCCH in the at least one partial subframe.

Processor 310 can generate a LAA DL burst, which can comprise PDSCH to be sent via the DL to one or more UEs via an unlicensed carrier. Processor 310 can generate one or more DL control channel messages that are associated with PDSCH scheduled during at least one partial subframe of the LAA DL burst. In various aspects, the one or more DL control channel messages can be PDCCH messages, EPDCCH messages, or a combination thereof. Additionally, processor 310 can generate a physical layer encoding of the LAA DL burst, which can include at least one partial subframe (e.g., a starting partial subframe and/or an ending partial subframe). The at least one partial subframe can comprise physical layer encodings of the one or more DL control channel messages. Processor 310 can output the at least one partial subframe to transmitter circuitry 320 for subsequent transmission (e.g., transmitter circuitry 320 can output the at least one partial subframe to one or more antenna ports for transmission via one or more antennas, etc.).

In various aspects, the at least one partial subframe includes a starting partial subframe. The starting partial subframe can comprise N symbols, wherein N is any positive integer less than a number of symbols in the associated complete subframe (e.g., N is any positive integer less than 14 for a normal CP subframe, N is any positive integer less than 12 for an extended CP subframe), such as the PCell subframe during which the LAA DL transmission begins. In some aspects, the starting partial subframe can comprise one slot (e.g., N=7 symbols for normal CP or N=6 symbols for extended CP).

Figure 4:
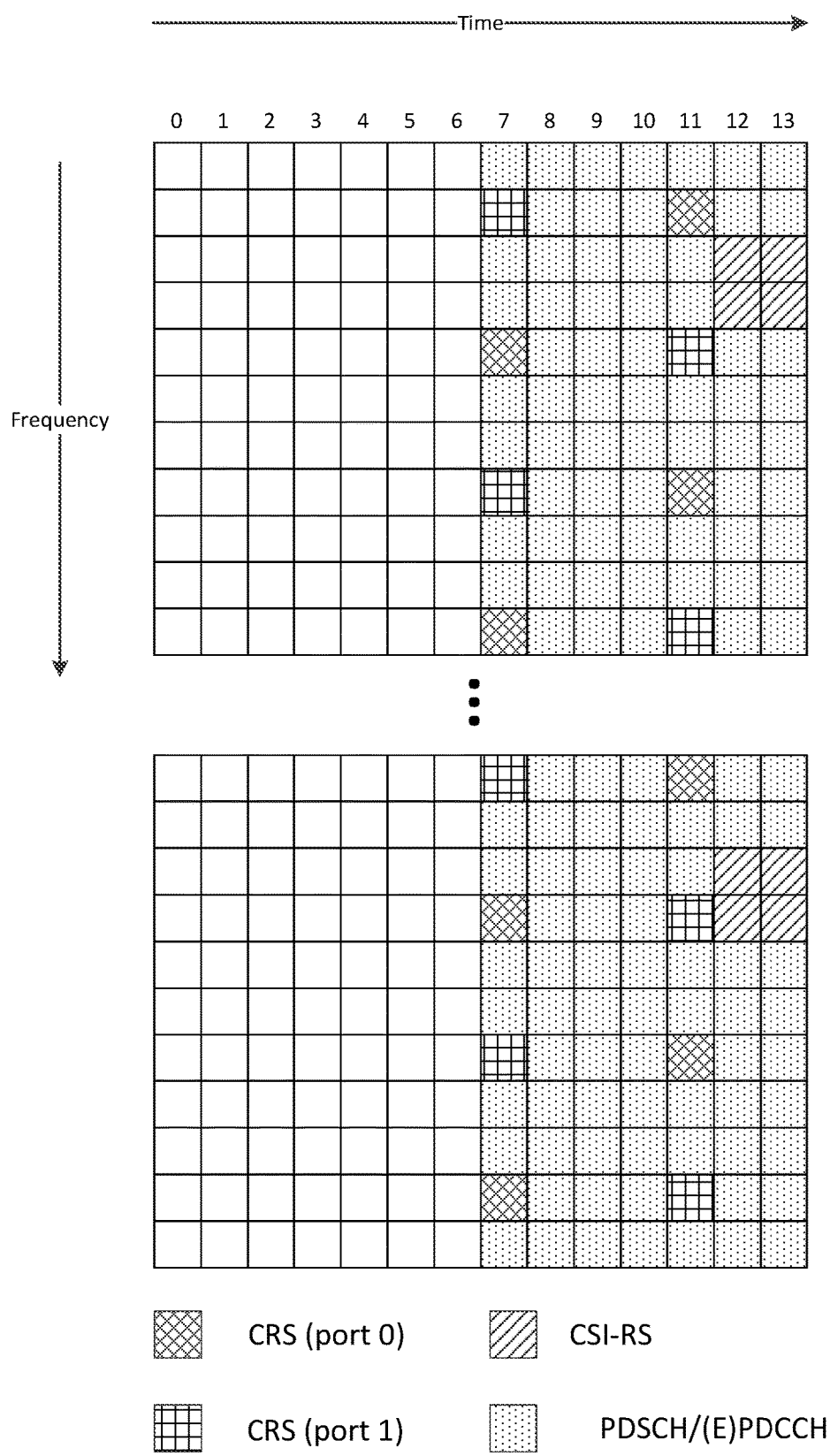
FIG. 4 is a diagram illustrating a starting partial subframe that can be modified to include (E)PDCCH according to various aspects described herein.

Referring to FIG. 4, illustrated is an example diagram of a starting partial subframe that can be modified to include (E)PDCCH according to various aspects described herein. Although the example starting partial subframe shown in FIG. 4 is a slot-aligned (e.g., comprising 1 slot) normal CP starting partial subframe, in various embodiments described herein, starting partial subframes can comprise any positive integer number of symbols less than the total number of symbols of a corresponding complete subframe (e.g., any positive integer less than 14 for normal CP, or any positive integer less than 12 for extended CP).

Figure 5:
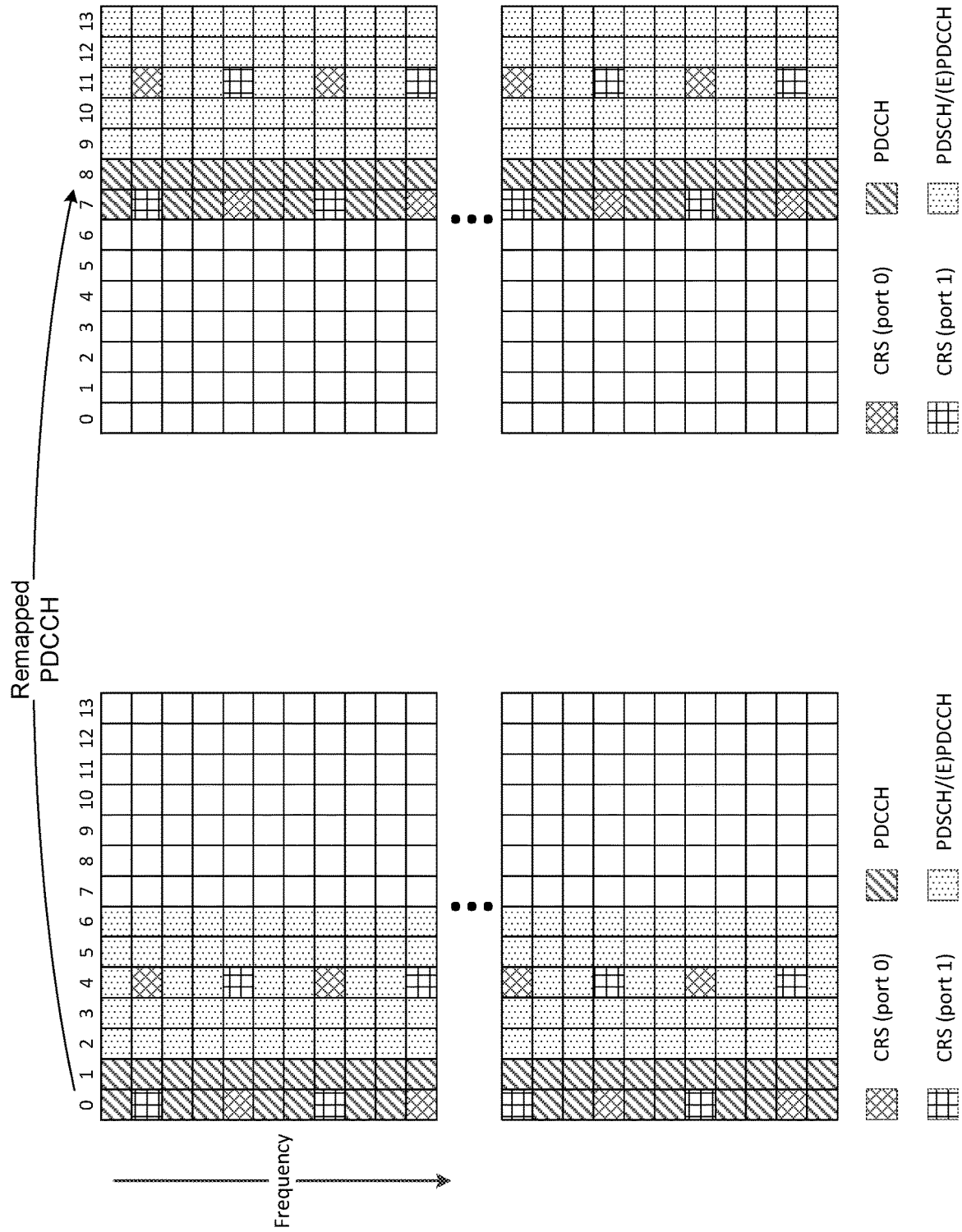
FIG. 5 is a diagram illustrating an example starting partial subframe comprising PDCCH, indicating that the PDCCH can be remapped from the first 1 to 4 symbols of a complete subframe to the first 1 to 4 symbols (2 in the example shown) of the starting partial subframe according to various aspects described herein.

In embodiments wherein the one or more DL control channel messages comprise PDCCH messages, those PDCCH messages can be shifted to the start of the starting partial subframe, such that the PDCCH messages can be transmitted during the first 1, 2, or 3 symbols of the starting partial subframe (or, for a bandwidth of 1.4 MHz, during the first 2, 3, or 4 symbols). For a starting partial subframe of N symbols, this corresponds to the symbols starting at symbol number 14-N in the associated complete subframe (e.g., the corresponding PCell subframe) and ending at symbol number 14-N, 14-N+1, or 14-N+2 for bandwidths other than 1.4 MHz (and ending at symbol number 14-N+1, 14-N+2 or 14-N+3 for 1.4 MHz). Referring to FIG. 5, illustrated is a diagram showing an example starting partial subframe comprising PDCCH on the right of FIG. 5, indicating that the PDCCH can be remapped from the first 1 to 4 symbols of a complete subframe to the first 1 to 4 symbols (2 in the example shown) of the starting partial subframe according to various aspects described herein.

Figure 6:
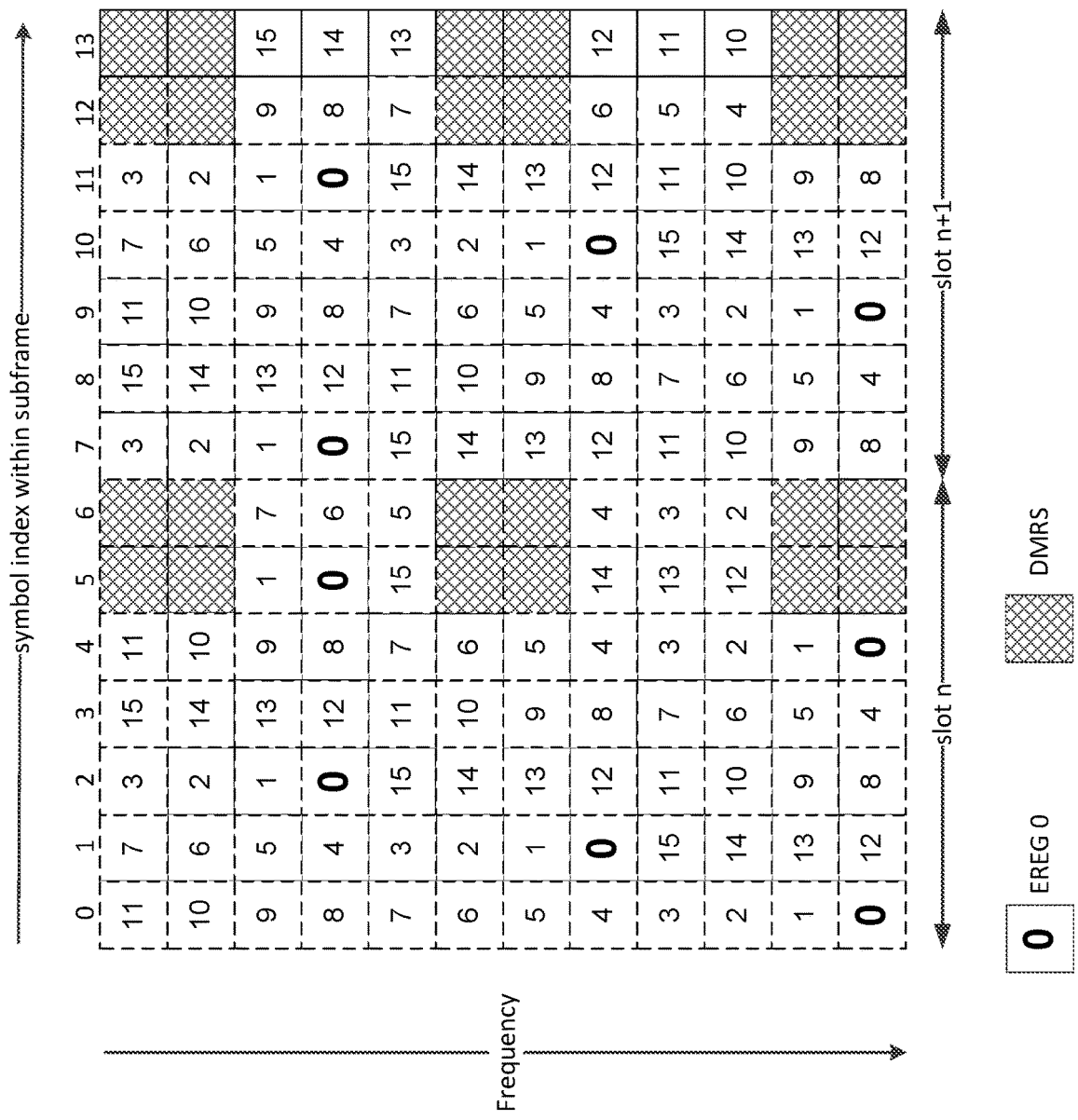
FIG. 6 is a diagram illustrating possible example mappings of EREGs to available REs of a starting partial subframe for transmission of EPDCCH according to various aspects described herein.
Figure 7:
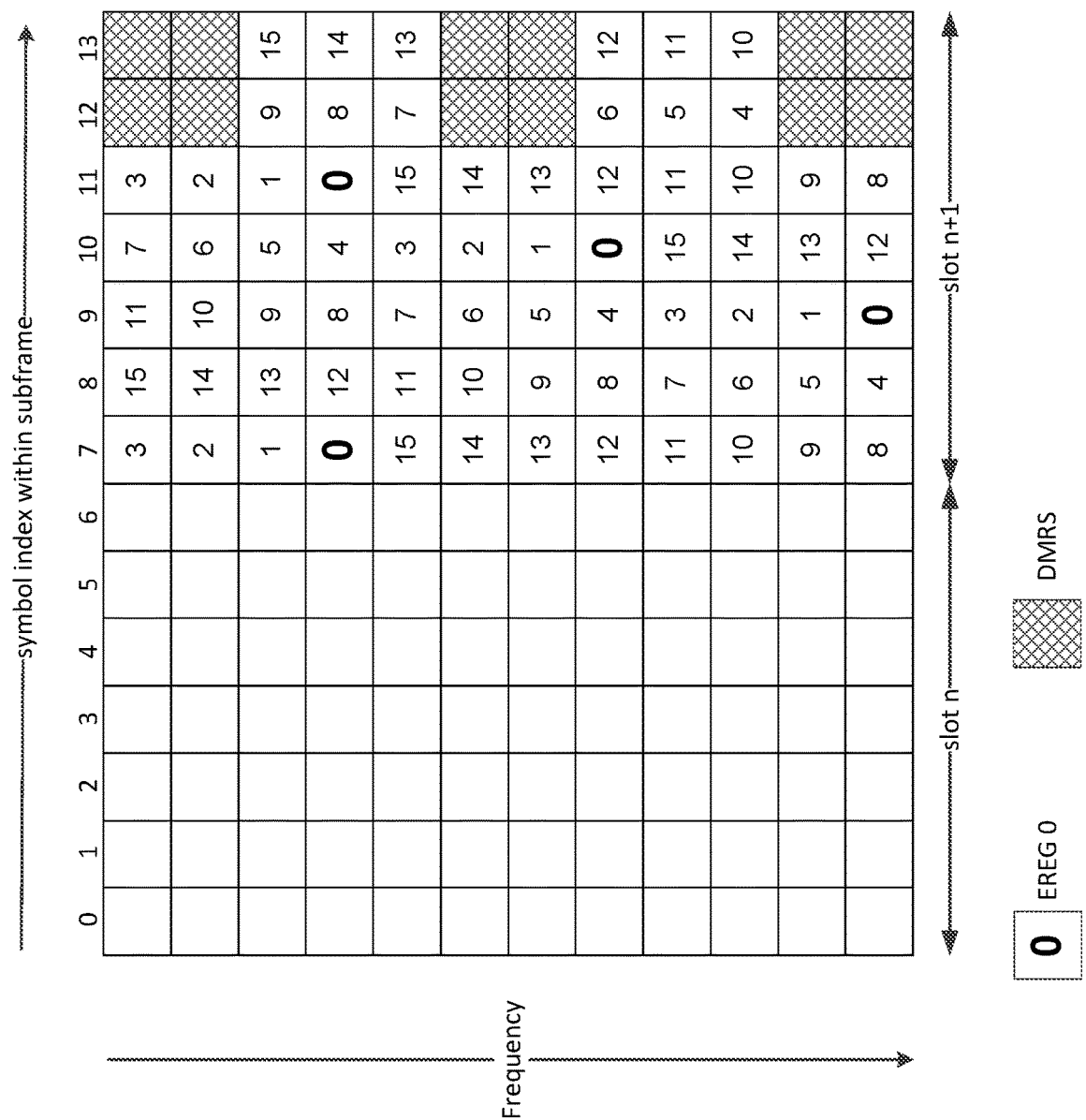
FIG. 7 is a diagram illustrating an example mapping of EREGs to available REs of a slot-aligned starting partial subframe for transmission of EPDCCH according to various aspects described herein.

In embodiments wherein the one or more DL control channel messages comprise EPDCCH messages, those EPDCCH messages can be mapped to resource elements (REs) of the starting partial subframe based on a mapping of enhanced resource element groups (EREGs) to available REs of the starting partial subframe. In various aspects, that mapping of EREGs to available REs of the starting partial subframe can correspond to the last N symbols of a mapping of EREGs to a complete subframe. Referring to FIG. 6, illustrated is a diagram showing possible example mappings of EREGs to available REs of a starting partial subframe for transmission of EPDCCH according to various aspects described herein. In FIG. 6, EREGs are mapped to available REs similarly to the mapping of EREGs to available REs for a complete subframe. However, only the final N symbols (with N any positive integer less than 14 for a normal CP subframe such as the example illustrated in FIG. 6) of the subframe shown in FIG. 6 will be transmitted as the starting partial subframe, as indicated via the dashed lines around the REs for symbols 0 through 12, some or all of which will be omitted, depending on the embodiment. Referring to FIG. 7, illustrated is a diagram showing an example mapping of EREGs to available REs of a slot-aligned starting partial subframe for transmission of EPDCCH according to various aspects described herein. The mapping shown in FIG. 7 is one possible embodiment of the different potential mappings of FIG. 6.

In various embodiments, the starting partial subframe (and/or one or more other partial subframes) can include PDCCH but not EPDCCH, can include EPDCCH but not PDCCH, or can include both PDCCH and EPDCCH.

In the same or other embodiments, the at least one partial subframe can comprise an ending partial subframe. In aspects, the ending partial subframe can comprise a downlink pilot time slot (DwPTS). In some embodiments, PDSCH transmitted via the ending partial subframe can be scheduled via (E)PDCCH also transmitted via the ending partial subframe, while in other embodiments, PDSCH transmitted via the ending partial subframe can be scheduled via (E)PDCCH transmitted via a previous subframe of the DL LAA burst transmission.

Figure 8:
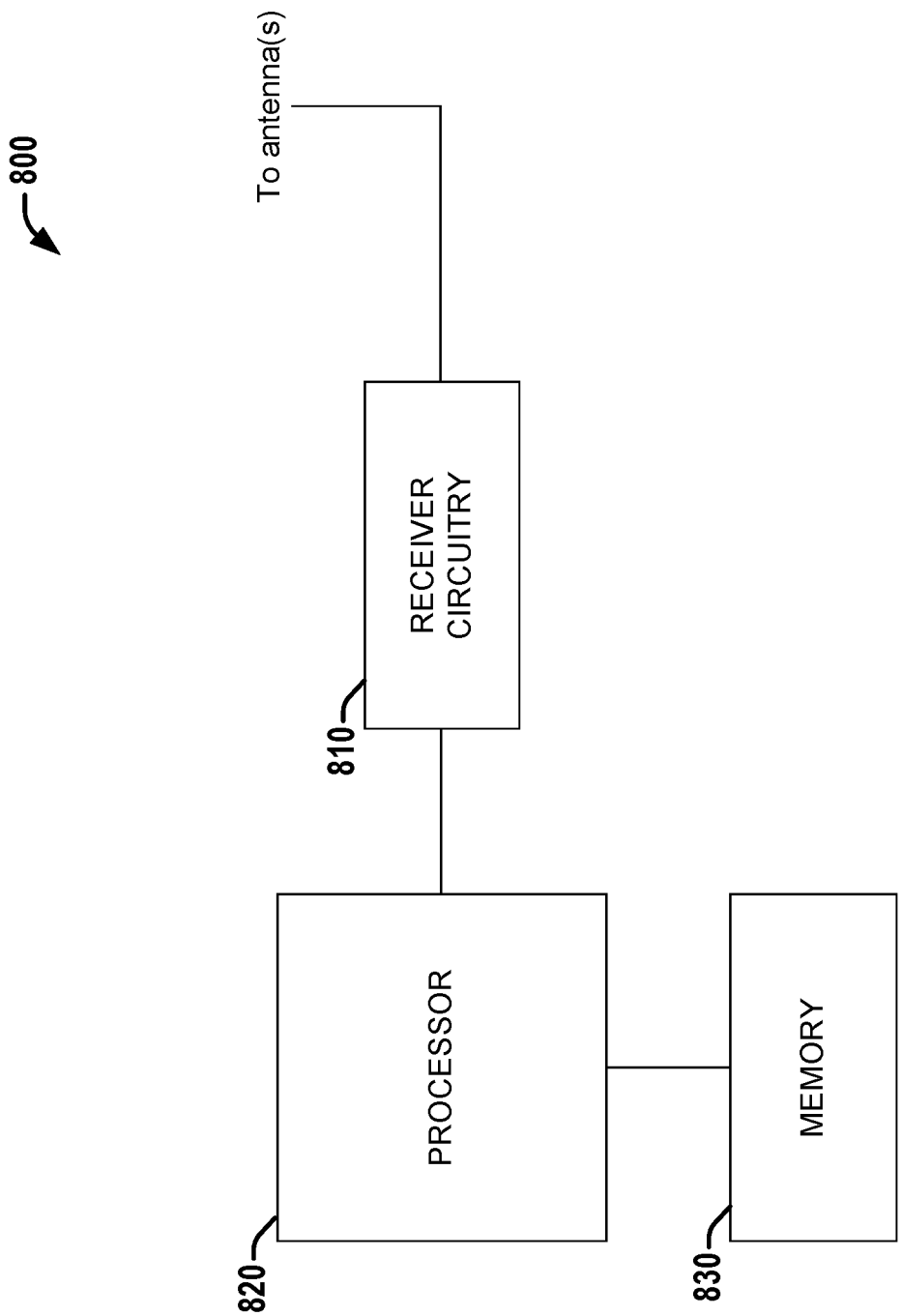
FIG. 8 is a block diagram illustrating a system that facilitates recovery of one or more downlink control channel messages by a user equipment (UE) from at least one partial subframe of a DL LAA burst according to various aspects described herein.

Referring to FIG. 8, illustrated is a block diagram of a system 800 that facilitates recovery of one or more downlink control channel messages by a user equipment (UE) from at least one partial subframe of a DL LAA burst according to various aspects described herein. System 800 can include receiver circuitry 810, a processor 820 (e.g., a baseband processor such as one of the baseband processors discussed in connection with FIG. 1), and a memory 830 (which can comprise any of a variety of storage mediums and can store instructions and/or data associated with one or more of receiver circuitry 810 or processor 820). In various aspects, system 800 can be included within a user equipment (UE). As described in greater detail below, system 800 can facilitate reception of and search for one or more downlink control channel messages transmitted via at least one partial subframe.

Receiver circuitry 810 can receive a LAA DL burst transmission that comprises one or more partial subframes (e.g., having less than 14 symbols for normal CP or less than 12 symbols for extended CP) that have one or more DL control channels, such as PDCCH, EPDCCH, or both. Receiver circuitry 810 can output the LAA burst to processor 820, which can receive the LAA burst therefrom.

Additionally, for each of the one or more partial subframes, processor 820 can determine one or more search spaces for the one or more DL control channels within that partial subframe, and can search the one or more search spaces for one or more downlink control information (DCI) messages associated with a UE employing system 700.

In various aspects, the one or more partial subframes received by processor 820 can comprise a starting partial subframe such as that described elsewhere herein, such as in connection with FIG. 3. Thus, such a starting partial subframe can comprise PDCCH, or EPDCCH, or both. When the starting partial subframe comprises PDCCH, that PDCCH can be received via the first 1 to 3 symbols for bandwidths greater than 1.4 MHz, or during the first 2 to 4 symbols for a bandwidth of 1.4 MHz. When the starting partial subframe comprises EPDCCH, that EPDCCH can be mapped to available REs based on a mapping such as that shown in FIG. 6. In the same or other aspects, the one or more partial subframes can comprise an ending partial subframe, which can comprise a DwPTS.

System level simulations that have been conducted suggest that the performance improvement for LAA and WiFi can be maximized if the possible starting positions of the DL data burst transmissions are spaced equally within the subframe. It is possible that in some cases equal spaces between the starting positions may not be possible due to the limitations on the number of available OFDM symbols. From these simulation results, it can be observed that the performance improvement by introducing multiple starting positions can be marginal compared to the case when the LAA DL data burst starts with the Pcell-aligned subframe boundary. Based on the above observations, in some embodiments, slot boundaries (e.g., OFDM symbols {0, 7} for normal CP) can be chosen as a tradeoff between the complexity and performance improvement. The same logic can be extended to the extended CP scenario, limiting the starting positions in some such embodiments to symbols {0, 6}.

The ending OFDM position can be computed as a function of reservation signal duration and the starting position such that the total DL transmission duration is limited by maximum channel occupancy time (MOOT). Thus, depending on the duration of the reservation signal and the time of LBT completion, it is possible for the ending OFDM symbol to be any of the symbols for normal CP (e.g., any of symbols 0 to 13). In other embodiments, the ending symbol can be determined as the ending symbol of the subframe to maintain continuity of DL and UL transmission if UL transmission will follow the DL transmission. At meeting 82bis of the RAN (radio access network) WG1 (working group 1) (RAN1-82bis), it was agreed that the ending position can be determined based on the existing Downlink Pilot Time Slot (DwPTS) design. Possible ending positions based on reusing the DwPTS configuration are limited to symbols {2, 5, 8, 9, 10, 11} for normal CP, giving 6 possible positions.

For PDCCH in a starting partial subframe, in a first set of embodiments, a PDCCH mapping for a slot aligned partial subframe can be employed for transmission of PDCCH via that partial subframe. In one set of embodiments, conventionally defined PDCCH REs (e.g., as currently defined in Release-12 LTE) can be remapped starting from a starting symbol of the slot aligned partial subframe (e.g., symbol 7 for a normal CP slot aligned partial subframe) rather than symbol 0. In another set of embodiments, the PDCCH design for slot aligned partial subframes can be generalized for partial subframes comprising x symbols. For example, the existing PDCCH REs (as currently defined in Release-12 LTE) can be remapped starting from symbol 14-x rather than symbol 0.

Figure 9:
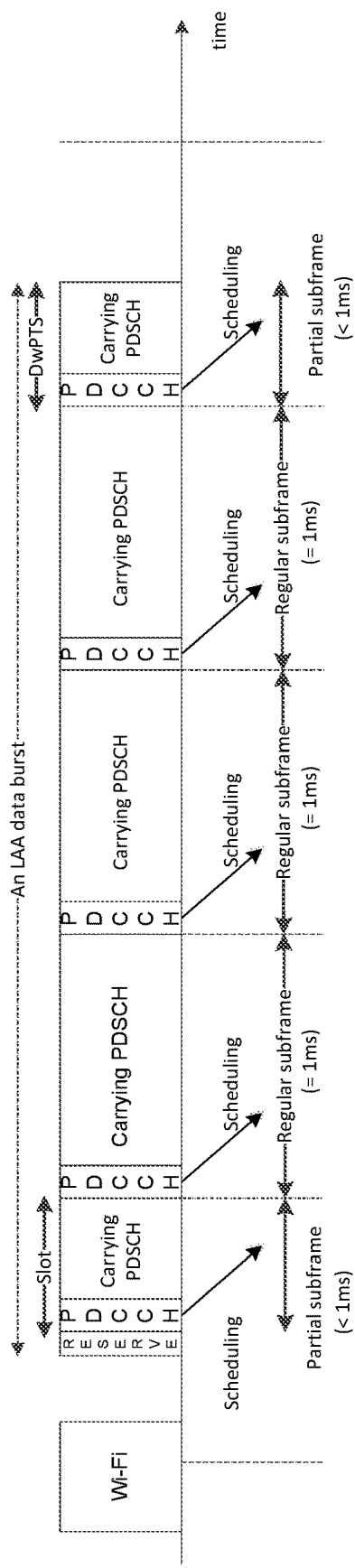
FIG. 9 is a timing diagram illustrating PDCCH transmission over a slot-aligned starting partial subframe, one or more complete subframes, and an ending partial subframe in a LAA DL burst transmission according to various aspects described herein.

Referring to FIG. 9, illustrated is a timing diagram of PDCCH transmission over a slot-aligned starting partial subframe, one or more complete subframes, and an ending partial subframe in a LAA DL burst transmission according to various aspects described herein.

Additionally or alternatively, EPDCCH can be transmitted in a starting partial subframe. In the Rel-12 (release 12) LTE design, EPDCCH is defined to support increased control channel capacity, be able to achieve improved spatial reuse of control channel resources, support beamforming and/or diversity, and support frequency-domain ICIC (inter-cell interference cancellation). As explained herein, in various aspects, EPDCCH can be transmitted via partial subframes.

EPDCCH can be used to carry downlink control information (DCI) for UE specific resource allocation. EPDCCH can be transmitted as FDM (frequency division multiplex) with PDSCH for a given UE occupying a subset of PRBs (physical resource blocks) as the easiest and simplest approach with minimal impact on PDSCH operation. EPDCCH has a configurable OFDM start symbol offset (from 0 to 3) to account for the PDCCH transmission. EPDCCH can be transmitted using an aggregation of {1, 2, 4, 8, 16, or 32} consecutive ECCEs (Enhanced Control Channel Elements), which can be decided based on link adaptation. Each ECCE combines 4 or 8 Enhanced Resource Element Groups (EREGs) comprising one or several PRB pairs.

As shown in FIG. 6, EREGs are used for defining the mapping of EPDCCH to REs. There are 16 EREGs per PRB pair in both normal and special subframes (e.g., subframes containing DwPTS) and for normal and extended CP, regardless of the presence of other signals. In each PRB pair, EREG indices {0, 1, . . . , 15} are sequentially mapped to the REs that are not used for EPDCCH DM (demodulation)-RS (reference symbol) in an increasing order in the frequency domain, and the indices continue over symbols in the time domain. Note that all REs with the number i in that PRB pair constitutes EREG number i. The EREG to RE mapping does not depend on the PRB pair#, subframe#, legacy control region size, DwPTS length or presence of other signals such as CRS (cell-specific reference symbols), CSI-RS (channel state information reference symbols), or PRS (positioning reference symbols). The actual REs used for EPDCCH transmission depend on several conditions, including that REs used for mapping are not assigned for cell specific reference signal, other synchronization signals, PDCCH or PBCH (physical broadcast channel).

Figure 10:
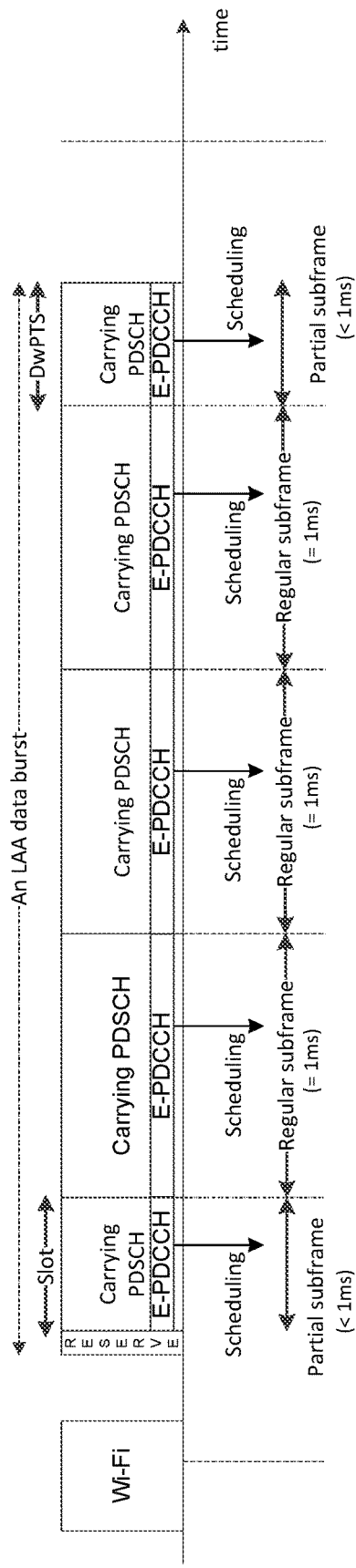
FIG. 10 is a timing diagram illustrating EPDCCH transmission over a slot-aligned starting partial subframe, one or more complete subframes, and an ending partial subframe in a LAA DL burst transmission according to various aspects described herein.

For EPDCCH in a starting partial subframe, in a first set of embodiments, the starting partial subframe can comprise one slot, based on a mapping such as that shown in FIG. 7. For an ending partial subframe, the existing EPDCCH design based on DwPTS can be employed. Referring to FIG. 10, illustrated is a timing diagram of EPDCCH transmission over a slot-aligned starting partial subframe, one or more complete subframes, and an ending partial subframe in a LAA DL burst transmission according to various aspects described herein.

In the first set of embodiments for EPDCCH in a starting partial subframe, the starting partial subframe can be a slot-aligned partial subframe, and the EREG mapping can be as shown in FIG. 7 for a slot-aligned partial subframe. In such embodiments, the starting OFDM symbol for EPDCCH transmission can be symbol 7, while the ending OFDM symbol can be 13, for a total of 7 symbols over which EPDCCH is transmitted. In the first set of embodiments for EPDCCH, the EPDCCH design can be similar to the existing design for the normal subframe and DwPTS design, omitting the mapping on symbols 0 to 6, as they are not transmitted. Thus, the EREG to RE mapping can remain the same as shown in FIG. 7. Additionally, the aggregation level and numerology can remain the same as that currently defined in Rel-12 for EPDCCH. In at least some embodiments of the first set of embodiments for EPDCCH, if EPDCCH is transmitted on the partial subframe, then PDCCH need not be transmitted.

In a second set of embodiments for EPDCCH in a starting partial subframe, the starting partial subframe can comprise x symbols, where x is any positive integer less than the maximum number of symbols in a complete subframe (e.g., x is any positive integer less than 14 for normal CP and any positive integer less than 12 for extended CP). In the second set of embodiments, the starting OFDM symbol for EPDCCH transmission can be symbol 14-x, while the ending OFDM symbol can be 13. Thus, in the second set of embodiments for EPDCCH, the total number of symbols over which EPDCCH is transmitted is x. Also in this second set of embodiments, the EPDCCH design can be similar to the existing design for the normal subframe and DwPTS design. Thus, the EREG to RE mapping can be based on any of the variations of mappings in FIG. 6, with the specific variation depending on the value of x. Additionally, in the second set of EPDCCH embodiments, the aggregation level and numerology can also remain the same as that currently defined in Rel-12 EPDCCH. Moreover, in at least some embodiments of the second set of EPDCCH embodiments, if EPDCCH is transmitted on the partial subframe, then PDCCH need not be transmitted.

Figure 11:
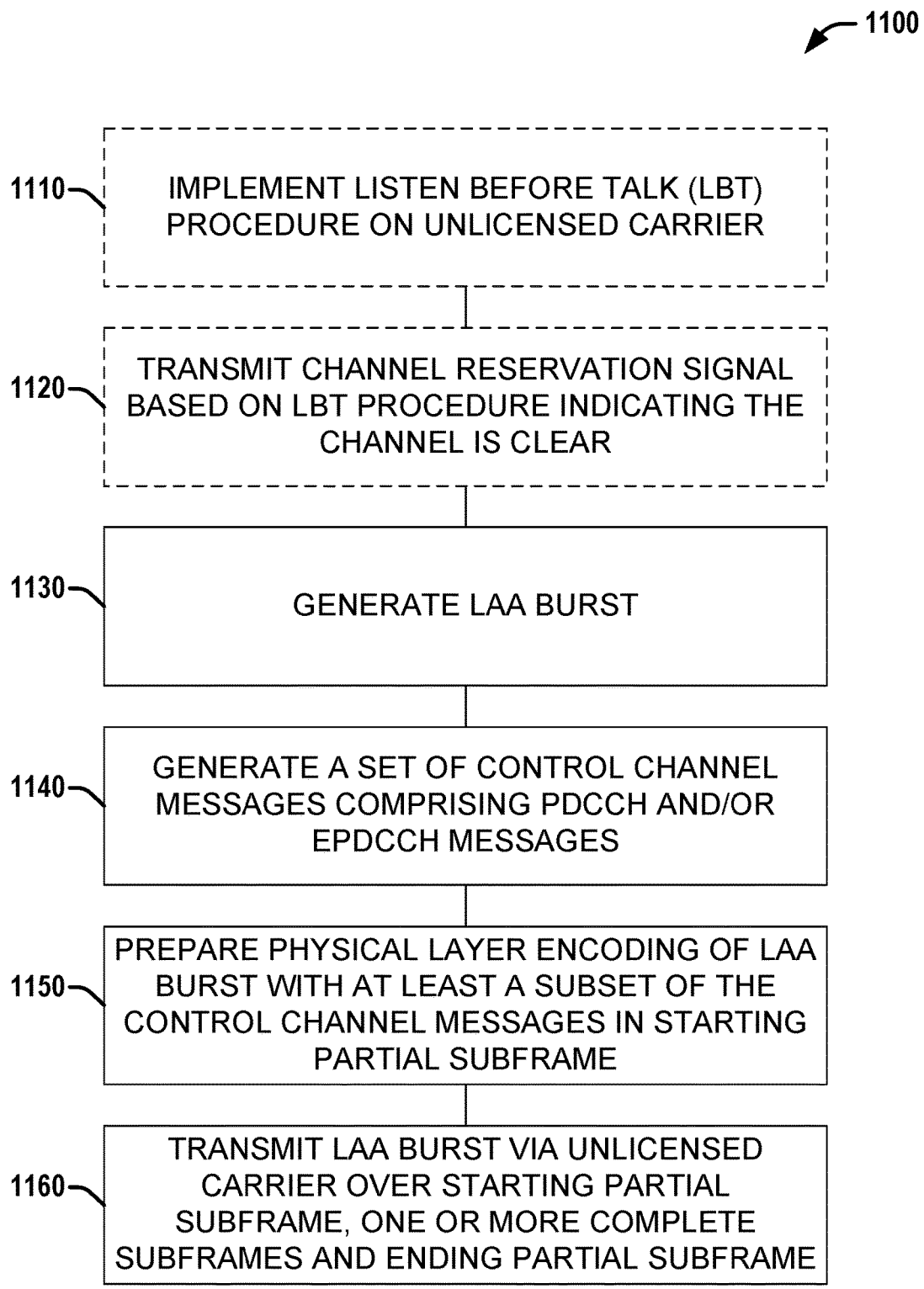
FIG. 11 is a flow diagram illustrating a method that facilitates transmission of PDCCH and/or EPDCCH via one or more partial subframes of an LAA burst from a base station according to various aspects described herein.

Referring to FIG. 11, illustrated is a flow diagram of a method 1100 that facilitates transmission of PDCCH and/or EPDCCH via one or more partial subframes of an LAA burst from a base station according to various aspects described herein. In some aspects, method 1100 can be performed at an eNB. In other aspects, a machine readable medium can store instructions associated with method 1100 that, when executed, can cause an eNB to perform the acts of method 1100.

At 1110, optionally, a listen before talk (LBT) procedure can be implemented on an unlicensed carrier. In various aspects, the LBT procedure can be a category 4 LBT procedure (LBT with random back-off with a contention window of variable size).

At 1120, in response to a successful LBT procedure indicating that the unlicensed carrier is clear, a channel reservation signal can optionally be transmitted on the unlicensed carrier.

At 1130, a LAA burst can be generated, comprising PDSCH to be transmitted on the unlicensed carrier.

At 1140, a set of control channel messages can be generated for the LAA burst, which can include PDCCH messages, EPDCCH messages, or a combination of both.

At 1150, a physical layer encoding of the LAA burst can be generated, which can comprise a starting partial subframe having N symbols (with N a positive integer less than a number of symbols in a complete subframe), one or more complete subframes, and an ending partial subframe (which can comprise a DwPTS). At least a subset of the set of control channel messages can be embedded in the starting partial subframe.

In some aspects, the starting partial subframe can be a slot-aligned partial subframe, for example, comprising 7 symbols for a normal CP subframe or comprising 6 symbols for an extended CP subframe. In other embodiments, the starting partial subframe can comprise other numbers of symbols.

At 1160, the physical layer encoding of the LAA burst can be transmitted on the unlicensed carrier. In embodiments wherein the starting partial subframe comprises PDCCH, the PDCCH can be transmitted via the first 1 to 3 symbols of the starting partial subframe for embodiments with a bandwidth greater than 1.4 MHz, and via the first 2 to 4 symbols for embodiments with a bandwidth of 1.4 MHz. In embodiments wherein the starting partial subframe comprises EPDCCH, the EPDCCH can be transmitted in REs based on a mapping of EREGs to available REs such as the mappings in FIG. 6 or FIG. 7.

Figure 12:
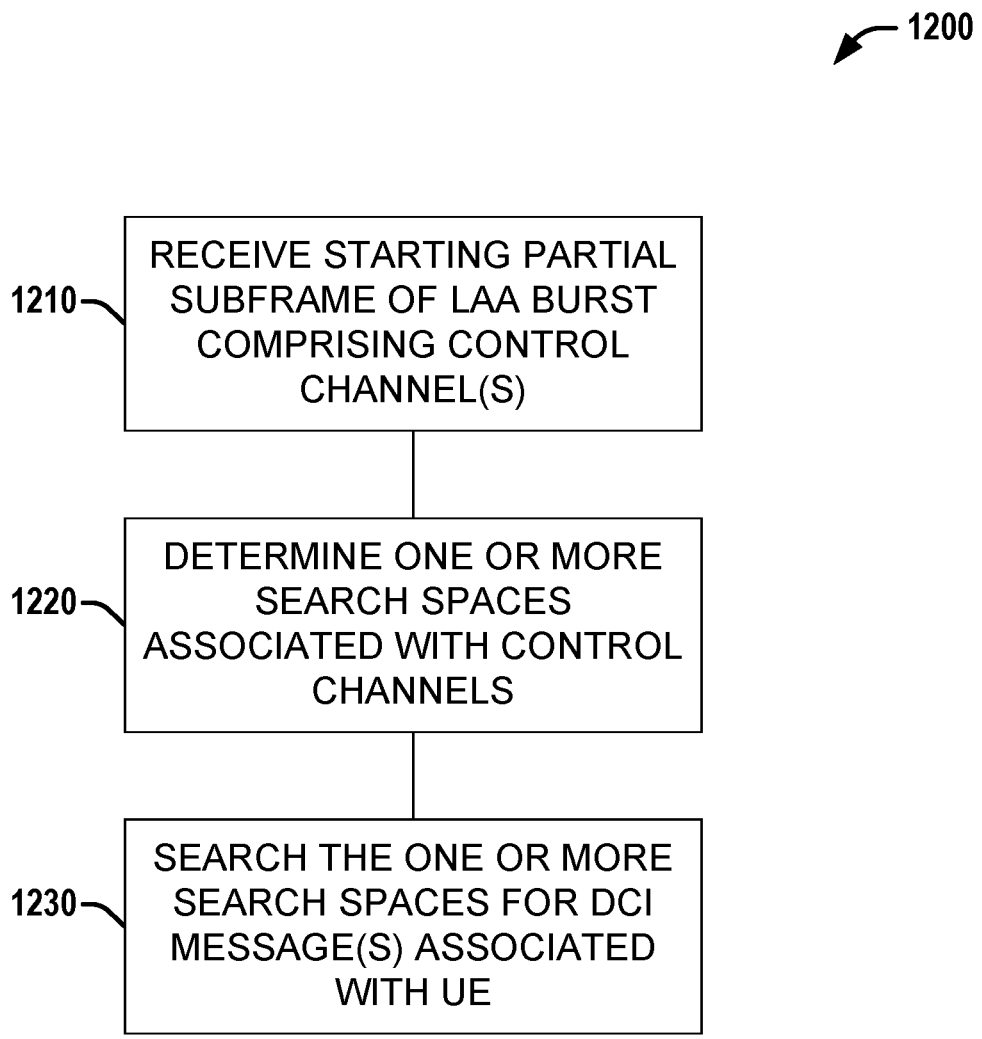
FIG. 12 is a flow diagram illustrating a method that facilitates reception of and search for one or more downlink control information (DCI) messages in PDCCH or EPDCCH during a partial subframe transmitted to a mobile terminal according to various aspects described herein.

Referring to FIG. 12, illustrated is a flow diagram of a method 1200 that facilitates reception of and search for one or more downlink control information (DCI) messages in PDCCH or EPDCCH during a partial subframe transmitted to a mobile terminal according to various aspects described herein. In some aspects, method 1200 can be performed at a UE. In other aspects, a machine readable medium can store instructions associated with method 1200 that, when executed, can cause a UE to perform the acts of method 1200.

At 1210, a starting partial subframe of a LAA DL burst transmission can be received, wherein the starting partial subframe comprises one or more control channels comprising PDCCH or EPDCCH. In embodiments wherein the starting partial subframe comprises PDCCH, the PDCCH can be received via the first 1 to 3 symbols of the starting partial subframe for embodiments with a bandwidth greater than 1.4 MHz, and via the first 2 to 4 symbols for embodiments with a bandwidth of 1.4 MHz. In embodiments wherein the starting partial subframe comprises EPDCCH, the EPDCCH can be received via REs based on a mapping of EREGs to available REs such as the mappings in FIG. 6 or FIG. 7.

At 1220, one or more search spaces can be determined associated with the one or more control channels.

At 1230, the one or more search spaces can be searched for one or more downlink control information (DCI) messages associated with the UE employing method 1200.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within an Evolved NodeB (eNB), comprising a processor configured to: generate a license assisted access (LAA) burst; generate one or more downlink control channel messages, wherein the one or more downlink control channel messages comprise at least one of physical downlink control channel (PDCCH) messages or enhanced PDCCH (EPDCCH) messages; generate a physical layer encoding of the LAA burst comprising a first partial subframe, wherein the first partial subframe comprises a physical layer encoding of the one or more downlink control channel messages; and output the first partial subframe comprising the physical layer encoding of the one or more control channel messages to transmitter circuitry for subsequent transmission via an unlicensed carrier.

Example 2 comprises the subject matter of any variation of example 1, wherein the first partial subframe comprises N symbols that correspond to a final N symbols of an associated subframe, wherein N is less than 14 when the associated subframe is associated with a normal cyclic prefix (CP), and wherein N is less than 12 when the associated subframe is associated with an extended CP.

Example 3 comprises the subject matter of any variation of example 2, wherein N is 7 when the subframe is associated with the normal CP, and wherein N is 6 when the subframe is associated with the extended CP.

Example 4 comprises the subject matter of any variation of any of examples 2-3, wherein the one or more downlink control channel messages comprise PDCCH messages.

Example 5 comprises the subject matter of any variation of example 4, wherein each of the one or more downlink control channel messages is a PDCCH message.

Example 6 comprises the subject matter of any variation of any of examples 4-5, wherein the processor is further configured to output the PDCCH messages for transmission via the first M symbols of the N symbols of the first partial subframe, wherein M is one, two, three, or four.

Example 7 comprises the subject matter of any variation of any of examples 2-3, wherein the one or more downlink control channel messages comprise EPDCCH messages.

Example 8 comprises the subject matter of any variation of example 7, wherein each of the one or more downlink control channel messages is an EPDCCH message.

Example 9 comprises the subject matter of any variation of any of examples 7-8, wherein the EPDCCH messages are mapped to Resource Elements (REs) of the first partial subframe based on a mapping of Enhanced Resource Element Groups (EREGs) to a set of available REs of the first partial subframe, wherein the mapping corresponds to a final N symbols of a sequential mapping in the frequency domain of EREGs to REs of the associated subframe.

Example 10 comprises the subject matter of any variation of example 2, wherein the one or more downlink control channel messages comprise PDCCH messages.

Example 11 comprises the subject matter of any variation of example 10, wherein each of the one or more downlink control channel messages is a PDCCH message.

Example 12 comprises the subject matter of any variation of example 10, wherein the processor is further configured to output the PDCCH messages for transmission via the first M symbols of the N symbols of the first partial subframe, wherein M is one, two, three, or four.

Example 13 comprises the subject matter of any variation of example 2, wherein the one or more downlink control channel messages comprise EPDCCH messages.

Example 14 comprises the subject matter of any variation of example 13, wherein the EPDCCH messages are mapped to Resource Elements (REs) of the first partial subframe based on a mapping of Enhanced Resource Element Groups (EREGs) to a set of available REs of the first partial subframe, wherein the mapping corresponds to a final N symbols of a sequential mapping in the frequency domain of EREGs to REs of the associated subframe.

Example 15 is a machine readable medium comprising instructions that, when executed, cause an evolved NodeB (eNB) to: generate a license assisted access (LAA) burst; generate a set of control channel messages comprising at least one of physical downlink control channel (PDCCH) messages or enhanced PDCCH (EPDCCH) messages; prepare a physical layer encoding of the LAA burst comprising a starting partial subframe, one or more complete subframes, and an ending partial subframe, wherein at least a subset of the set of control channel messages are embedded in the starting partial subframe; and transmit the physical layer encoding of the LAA burst on an unlicensed carrier, wherein the starting partial subframe comprises N symbols and is transmitted during the final N symbols of an associated subframe, wherein N is less than 14 when the associated subframe is associated with a normal cyclic prefix (CP), and wherein N is less than 12 when the associated subframe is associated with an extended CP.

Example 16 comprises the subject matter of any variation of example 15, wherein N is 7 when the associated subframe is associated with the normal CP, and wherein N is 6 when the associated subframe is associated with the extended CP.

Example 17 comprises the subject matter of any variation of any of examples 15-16, wherein the subset of the set of control channel messages comprises at least one PDCCH message.

Example 18 comprises the subject matter of any variation of example 17, wherein each message of the subset of the set of control channel messages is a PDCCH message.

Example 19 comprises the subject matter of any variation of any of examples 17-18, wherein the at least one PDCCH message is transmitted via the first M symbols of the starting partial subframe, wherein M is less than or equal to four.

Example 20 comprises the subject matter of any variation of any of examples 15-16, wherein the subset of the set of control channel messages comprises at least one EPDCCH message.

Example 21 comprises the subject matter of any variation of example 20, wherein each message of the subset of the set of control channel messages is an EPDCCH message.

Example 22 comprises the subject matter of any variation of any of examples 20-21, wherein the at least one EPDCCH message is transmitted via a set of resource elements (REs) of the starting partial subframe based on a sequential mapping in a frequency domain of enhanced resource element group (EREG) indices to the N symbols of the starting partial subframe, wherein the sequential mapping corresponds to a final N symbols of an associated sequential mapping in the frequency domain of EREGs to REs of the associated subframe.

Example 23 comprises the subject matter of any variation of any of examples 15-22, wherein the instructions further cause the eNB to: implement a listen before talk (LBT) procedure on the unlicensed carrier; and transmit a channel reservation signal in response to the LBT procedure indicating the unlicensed carrier is clear.

Example 24 comprises the subject matter of any variation of any of examples 15-23, wherein the ending partial subframe comprises a downlink pilot time slot (DwPTS).

Example 25 comprises the subject matter of any variation of example 15, wherein the subset of the set of control channel messages comprises at least one PDCCH message.

Example 26 comprises the subject matter of any variation of example 25, wherein the at least one PDCCH message is transmitted via the first M symbols of the starting partial subframe, wherein M is less than or equal to four.

Example 27 comprises the subject matter of any variation of example 20, wherein the subset of the set of control channel messages comprises at least one EPDCCH message.

Example 28 comprises the subject matter of any variation of example 27, wherein the at least one EPDCCH message is transmitted via a set of resource elements (REs) of the starting partial subframe based on a sequential mapping in a frequency domain of enhanced resource element group (EREG) indices to the N symbols of the starting partial subframe, wherein the sequential mapping corresponds to a final N symbols of an associated sequential mapping in the frequency domain of EREGs to REs of the associated subframe.

Example 29 comprises the subject matter of any variation of example 15, wherein the instructions further cause the eNB to: implement a listen before talk (LBT) procedure on the unlicensed carrier; and transmit a channel reservation signal in response to the LBT procedure indicating the unlicensed carrier is clear.

Example 30 comprises the subject matter of any variation of example 15, wherein the ending partial subframe comprises a downlink pilot time slot (DwPTS).

Example 31 is an apparatus configured to be employed within a User Equipment (UE), comprising a processor configured to: receive, via coupled receiver circuitry, a license assisted access (LAA) burst transmission comprising a first partial subframe, wherein the first partial subframe comprises at least one downlink control channel, wherein the at least one control channel is one or more of a physical downlink control channel (PDCCH) or an enhanced PDCCH (EPDCCH); determine at least one search space associated with the at least one of the PDCCH or the EPDCCH of the first partial subframe; and search the at least one search space for one or more downlink control information (DCI) messages associated with the UE.

Example 32 comprises the subject matter of any variation of example 31, wherein the first partial subframe comprises N symbols that correspond to a final N symbols of an associated subframe, wherein N is less than 14 when the associated subframe is associated with a normal cyclic prefix (CP), and wherein N is less than 12 when the associated subframe is associated with an extended CP.

Example 33 comprises the subject matter of any variation of example 32, wherein N is 7 when the subframe is associated with the normal CP, and wherein N is 6 when the subframe is associated with the extended CP.

Example 34 comprises the subject matter of any variation of any of examples 32-33, wherein the downlink control channel comprises the PDCCH.

Example 35 comprises the subject matter of any variation of example 34, wherein the processor is configured to receive the PDCCH via the first M symbols of the N symbols of the first partial subframe, wherein M is one, two, three, or four.

Example 36 comprises the subject matter of any variation of any of examples 32-33, wherein the downlink control channel comprises the EPDCCH.

Example 37 comprises the subject matter of any variation of example 32, wherein the downlink control channel comprises the PDCCH.

Example 38 comprises the subject matter of any variation of example 32, wherein the downlink control channel comprises the EPDCCH.

Example 39 is a method configured to be employed within an evolved NodeB (eNB), comprising: generating a license assisted access (LAA) burst; generating a set of control channel messages comprising at least one of physical downlink control channel (PDCCH) messages or enhanced PDCCH (EPDCCH) messages; preparing a physical layer encoding of the LAA burst comprising a starting partial subframe, one or more complete subframes, and an ending partial subframe, wherein at least a subset of the set of control channel messages are embedded in the starting partial subframe; and transmitting the physical layer encoding of the LAA burst on an unlicensed carrier, wherein the starting partial subframe comprises N symbols and is transmitted during the final N symbols of an associated subframe, wherein N is less than 14 when the associated subframe is associated with a normal cyclic prefix (CP), and wherein N is less than 12 when the associated subframe is associated with an extended CP.

Example 40 comprises the subject matter of any variation of example 39, wherein N is 7 when the associated subframe is associated with the normal CP, and wherein N is 6 when the associated subframe is associated with the extended CP.

Example 41 comprises the subject matter of any variation of any of examples 39-40, wherein the subset of the set of control channel messages comprises at least one PDCCH message.

Example 42 comprises the subject matter of any variation of example 41, wherein each message of the subset of the set of control channel messages is a PDCCH message.

Example 43 comprises the subject matter of any variation of any of examples 41-42, wherein the at least one PDCCH message is transmitted via the first M symbols of the starting partial subframe, wherein M is less than or equal to four.

Example 44 comprises the subject matter of any variation of any of examples 39-40, wherein the subset of the set of control channel messages comprises at least one EPDCCH message.

Example 45 comprises the subject matter of any variation of example 44, wherein each message of the subset of the set of control channel messages is an EPDCCH message.

Example 46 comprises the subject matter of any variation of any of examples 44-45, wherein the at least one EPDCCH message is transmitted via a set of resource elements (REs) of the starting partial subframe based on a sequential mapping in a frequency domain of enhanced resource element group (EREG) indices to the N symbols of the starting partial subframe, wherein the sequential mapping corresponds to a final N symbols of an associated sequential mapping in the frequency domain of EREGs to REs of the associated subframe.

Example 47 comprises the subject matter of any variation of any of examples 39-46, further comprising: implementing a listen before talk (LBT) procedure on the unlicensed carrier; and transmitting a channel reservation signal in response to the LBT procedure indicating the unlicensed carrier is clear.

Example 48 is a machine readable medium comprising instructions that, when executed, cause a machine to perform a method comprising the subject matter of any variation of any of examples 39-47.

Example 49 is an apparatus configured to be employed within an Evolved NodeB (eNB), comprising means for processing and means for transmitting. The means for processing is configured to: generate a license assisted access (LAA) burst; generate one or more downlink control channel messages, wherein the one or more downlink control channel messages comprise at least one of physical downlink control channel (PDCCH) messages or enhanced PDCCH (EPDCCH) messages; and generate a physical layer encoding of the LAA burst comprising a first partial subframe, wherein the first partial subframe comprises a physical layer encoding of the one or more downlink control channel messages. The means for transmitting is configured to transmit, via an unlicensed carrier, the first partial subframe comprising the physical layer encoding of the one or more control channel messages.

Example 50 comprises the subject matter of any variation of example 49, wherein the first partial subframe comprises N symbols that correspond to a final N symbols of an associated subframe, wherein N is less than 14 when the associated subframe is associated with a normal cyclic prefix (CP), and wherein N is less than 12 when the associated subframe is associated with an extended CP.

Example 51 comprises the subject matter of any variation of example 50, wherein N is 7 when the subframe is associated with the normal CP, and wherein N is 6 when the subframe is associated with the extended CP.

Example 52 comprises the subject matter of any variation of any of examples 50-51, wherein the one or more downlink control channel messages comprise PDCCH messages.

Example 53 comprises the subject matter of any variation of example 52, wherein each of the one or more downlink control channel messages is a PDCCH message.

Example 54 comprises the subject matter of any variation of any of examples 52-53, wherein the processor is further configured to output the PDCCH messages for transmission via the first M symbols of the N symbols of the first partial subframe, wherein M is one, two, three, or four.

Example 55 comprises the subject matter of any variation of any of examples 50-51, wherein the one or more downlink control channel messages comprise EPDCCH messages.

Example 56 comprises the subject matter of any variation of example 55, wherein each of the one or more downlink control channel messages is an EPDCCH message.

Example 57 comprises the subject matter of any variation of any of examples 55-56, wherein the EPDCCH messages are mapped to Resource Elements (REs) of the first partial subframe based on a mapping of Enhanced Resource Element Groups (EREGs) to a set of available REs of the first partial subframe, wherein the mapping corresponds to a final N symbols of a sequential mapping in the frequency domain of EREGs to REs of the associated subframe.

Example 58 comprises the subject matter of any variation of any of examples 49-51, further comprising means for receiving configured to implement a listen before talk (LBT) procedure on the unlicensed carrier, wherein the means for transmitting are further configured to transmit a channel reservation signal in response to the LBT procedure indicating the unlicensed carrier is clear.

Example 59 is an apparatus configured to be employed within a User Equipment (UE), comprising means for receiving and means for processing. The means for receiving is configured to receive a license assisted access (LAA) burst transmission comprising a first partial subframe, wherein the first partial subframe comprises at least one downlink control channel, wherein the at least one control channel is one or more of a physical downlink control channel (PDCCH) or an enhanced PDCCH (EPDCCH). The means for processing is configured to: determine at least one search space associated with the at least one of the PDCCH or the EPDCCH of the first partial subframe; and search the at least one search space for one or more downlink control information (DCI) messages associated with the UE.

Example 60 comprises the subject matter of any variation of any of examples 1-14, wherein the processor is a baseband processor.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within an Evolved NodeB (eNB), comprising:
   a processor configured to:
   generate a license assisted access (LAA) burst;
   generate one or more downlink control channel messages, wherein the one or more downlink control channel messages comprise at least one of physical downlink control channel (PDCCH) messages or enhanced PDCCH (EPDCCH) messages;
   generate a physical layer encoding of the LAA burst comprising a first partial subframe, wherein the first partial subframe comprises a physical layer encoding of the one or more downlink control channel messages; and
   output the first partial subframe comprising the physical layer encoding of the one or more control channel messages to transmitter circuitry for subsequent transmission via an unlicensed carrier,
   wherein the first partial subframe comprises N symbols that correspond to a final N symbols of an associated subframe, wherein N is less than 14 when the associated subframe is associated with a normal cyclic prefix (CP), and wherein N is less than 12 when the associated subframe is associated with an extended CP,
   wherein the one or more downlink control channel messages comprise PDCCH messages, wherein the processor is further configured to output the PDCCH messages for transmission via the first M symbols of the N symbols of the first partial subframe, wherein M is one, two, three, or four.

2. The apparatus of claim 1, wherein N is 7 when the subframe is associated with the normal CP, and wherein N is 6 when the subframe is associated with the extended CP.

3. The apparatus of claim 1, wherein each of the one or more downlink control channel messages is a PDCCH message.

4. The apparatus of claim 1, wherein the one or more downlink control channel messages comprise EPDCCH messages.

5. The apparatus of claim 4, wherein each of the one or more downlink control channel messages is an EPDCCH message.

6. The apparatus of claim 4, wherein the EPDCCH messages are mapped to Resource Elements (REs) of the first partial subframe based on a mapping of Enhanced Resource Element Groups (EREGs) to a set of available REs of the first partial subframe, wherein the mapping corresponds to a final N symbols of a sequential mapping in the frequency domain of EREGs to REs of the associated subframe.

7. A non-transitory machine readable medium comprising instructions that, when executed, cause an evolved NodeB (eNB) to:
   generate a license assisted access (LAA) burst;
   generate a set of control channel messages comprising at least one of physical downlink control channel (PDCCH) messages or enhanced PDCCH (EPDCCH) messages;
   prepare a physical layer encoding of the LAA burst comprising a starting partial subframe, one or more complete subframes, and an ending partial subframe, wherein at least a subset of the set of control channel messages are embedded in the starting partial subframe; and
   transmit the physical layer encoding of the LAA burst on an unlicensed carrier, wherein the starting partial subframe comprises N symbols and is transmitted during the final N symbols of an associated subframe, wherein N is less than 14 when the associated subframe is associated with a normal cyclic prefix (CP), and wherein N is less than 12 when the associated subframe is associated with an extended CP, wherein the subset of the set of control channel messages comprises at least one PDCCH message, wherein the at least one PDCCH message is transmitted via the first M symbols of the starting partial subframe, wherein M is less than or equal to four.

8. The machine readable medium of claim 7, wherein N is 7 when the associated subframe is associated with the normal CP, and wherein N is 6 when the associated subframe is associated with the extended CP.

9. The machine readable medium of claim 7, wherein each message of the subset of the set of control channel messages is a PDCCH message.

10. The machine readable medium of claim 7, wherein the subset of the set of control channel messages comprises at least one EPDCCH message.

11. The machine readable medium of claim 10, wherein each message of the subset of the set of control channel messages is an EPDCCH message.

12. The machine readable medium of claim 10, wherein the at least one EPDCCH message is transmitted via a set of resource elements (REs) of the starting partial subframe based on a sequential mapping in a frequency domain of enhanced resource element group (EREG) indices to the N symbols of the starting partial subframe, wherein the sequential mapping corresponds to a final N symbols of an associated sequential mapping in the frequency domain of EREGs to REs of the associated subframe.

13. The machine readable medium of claim 7, wherein the instructions further cause the eNB to:
implement a listen before talk (LBT) procedure on the unlicensed carrier; and
transmit a channel reservation signal in response to the LBT procedure indicating the unlicensed carrier is clear.

14. The machine readable medium of claim 7, wherein the ending partial subframe comprises a downlink pilot time slot (DwPTS).

15. An apparatus configured to be employed within a User Equipment (UE), comprising:
a processor configured to:
receive, via coupled receiver circuitry, a license assisted access (LAA) burst transmission comprising a first partial subframe, wherein the first partial subframe comprises at least one downlink control channel, wherein the at least one downlink control channel is one or more of a physical downlink control channel (PDCCH) or an enhanced PDCCH (EPDCCH);
determine at least one search space associated with the at least one of the PDCCH or the EPDCCH of the first partial subframe; and
search the at least one search space for one or more downlink control information (DCI) messages associated with the UE,
wherein the first partial subframe comprises N symbols that correspond to a final N symbols of an associated subframe, wherein N is less than 14 when the associated subframe is associated with a normal cyclic prefix (CP), and wherein N is less than 12 when the associated subframe is associated with an extended CP,
wherein the at least one downlink control channel comprises the PDCCH, and
wherein the processor is configured to receive the PDCCH via the first M symbols of the N symbols of the first partial subframe, wherein M is one, two, three, or four.

16. The apparatus of claim 15, wherein N is 7 when the subframe is associated with the normal CP, and wherein N is 6 when the subframe is associated with the extended CP.

17. The apparatus of claim 15, wherein the at least one downlink control channel comprises the EPDCCH.

* * * * *